United States Patent [19]

Nelson

[11] E Re. 30,583

[45] Reissued Apr. 21, 1981

[54] VINYL ESTER RESIN COMPOSITIONS CONTAINING DICYCLOPENTADIENE ALKENOATE

[75] Inventor: Donald L. Nelson, Lake Jackson, Tex.

[73] Assignee: The Dow Chemical Company, Midland, Mich.

[21] Appl. No.: 6,311

[22] Filed: Jan. 24, 1979

Related U.S. Patent Documents

Reissue of:

[64] Patent No.: 4,117,030
Issued: Sep. 26, 1978
Appl. No.: 814,358
Filed: Jul. 11, 1977

[51] Int. Cl.[3] ..... C08L 63/00

[52] U.S. Cl. ..... 525/531; 260/37 E; 260/42.28; 428/417; 525/922

[58] Field of Search ..... 260/836, 837 R; 525/531, 922

[56] References Cited

U.S. PATENT DOCUMENTS

| | | | |
|---|---|---|---|
| 3,301,743 | 1/1967 | Fekete | 260/836 |
| 3,373,075 | 3/1968 | Fekete | 260/837 R |
| 3,377,406 | 4/1968 | Newey | 260/837 R |
| 3,432,458 | 3/1969 | Kwan | 260/861 |
| 3,564,074 | 2/1971 | Swisher | 260/836 |
| 3,634,542 | 1/1972 | Dowd | 260/836 |
| 3,660,526 | 5/1972 | Wegemund | 260/836 |
| 3,810,826 | 5/1974 | Manl | 260/836 |

FOREIGN PATENT DOCUMENTS 1114585 5/1968 United Kingdom .

*Primary Examiner*—Paul Lieberman
*Attorney, Agent, or Firm*—B. G. Colley

[57] ABSTRACT

Thermosetting resin compositions containing vinyl ester resins having terminal unsaturation, vinyl aromatic monomers, and dicyclopentadiene alkenoate concentrates are useful to make fibrous reinforcement laminates. The use of the dicyclopentadiene alkenoate concentrate accelerates the rate at which hardness develops during room temperature cure.

9 Claims, No Drawings

VINYL ESTER RESIN COMPOSITIONS CONTAINING DICYCLOPENTADIENE ALKENOATE

Matter enclosed in heavy brackets [ ] appears in the original patent but forms no part of this reissue specification; matter printed in italics indicates the additions made by reissue.

BACKGROUND OF THE INVENTION

This invention relates to a thermosetting resin composition containing vinyl ester resins having terminal unsaturation, a vinyl aromatic monomer, and a dicyclopentadiene alkenoate concentrate and laminates prepared from them. More specifically, the invention relates to compositions containing vinyl ester resins produced by reacting a polyepoxide resin with an ethylenically unsaturated monocarboxylic acid in about equivalent amounts. These vinyl ester resins are blended with vinyl aromatic monomers and a dicyclopentadiene acrylate concentrate to produce a thermosetting resin composition or blend.

Vinyl ester resins having terminal unsaturation defined above, are commercially available and well known from U.S. Pat. Nos. 3,367,992; 3,564,074 and 3,594,247.

The above patents indicate a wide variety of unsaturated monomers that can be used to cure the above vinyl ester resins.

SUMMARY OF THE INVENTION

It now has been found that a thermosetting resin composition can be prepared using a vinyl ester resin having terminal unsaturation and about 20 to about 70% by weight of an unsaturated monomer mixture of a vinyl aromatic monomer and a dicyclopentadiene alkenoate concentrate. An advantage of this invention is that the use of a dicyclopentadiene alkenoate concentrate accelerates the rate at which hardness develops during the room temperature cure of the resins.

The thermosetting resin composition of this invention comprises (A) about 80 to about 30% by weight of a vinyl ester resin having terminal unsaturation, (B) about 20 to about 70% by weight of an unsaturated monomer mixture of a vinyl aromatic monomer and a dicyclopentadiene alkenoate concentrate wherein the range of dicyclopentadiene alkenoate concentrate in said mixture ranges from about 5 to about 90 weight percent.

A related aspect of this invention is a fibrous reinforcement laminate which has been impregnated and cured with the above composition.

The vinyl ester resin is blended with an ethylenically unsaturated monomer mixture copolymerizable with the resin. The mixture comprises vinyl aromatic monomers such as styrene, methyl styrene, chlorostyrene, vinyl toluene, divinyl benzene or diallyl phthalate with about 5 to about 90 weight percent of dicyclopentadiene alkenoate concentrate.

These vinyl ester blends with the unsaturated monomer mixture should contain 20 to about 70 percent by weight and preferably 30 to 50 percent by weight of the monomer mixture based on the weight of the vinyl ester resin. A small amount of an inhibitor such as tertiary butyl catechol or the like is added to this mixture. The amount added is not critical but is generally in the range from about 50–300 parts per million based on the amount of unsaturated monomer.

The final blend is a crosslinkable vinyl ester composition which is useful to make laminates, moldings, and coatings.

DETAILED DESCRIPTION OF THE INVENTION

The dicyclopentadiene alkenoate concentrates used herein are made by the acid catalyzed reaction of a commercial $C_{10}$ hydrocarbon stream containing at least 50% dicyclopentadiene with an alkenoic acid such as acrylic acid. The process is known from British Pat. No. 1,114,585.

While it is preferred to use acrylic acid in this process, other monocarboxylic alkenoic acids having 3–5 carbon atoms can be used such as methacrylic acid, crotonic acid, isocrotonic acid, angelic acid, tiglic acid, and mixtures thereof.

[The concentrates thus prepared consist mainly of (a) about 50–100% by weight of compounds of the formula]

[ 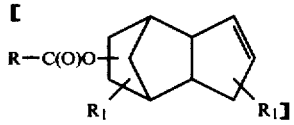

]

[(b) about 0–30% of compounds of the formula]

[ 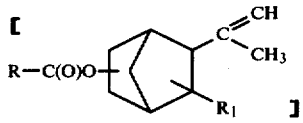

]

[(c) about 0–2% of compounds of the formula]

[ 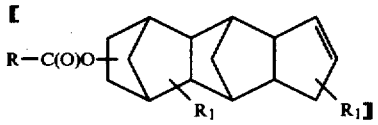

]

[and (d) about 0–2% of compounds of the formula]

[ 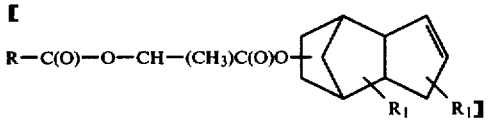

]

[where R is a alkenyl group such as acrylyl, methacrylyl, crotonyl, etc. and $R_1$ is hydrogen or a methyl group.]

The vinyl ester resins having terminal unsaturation used herein are prepared by reacting an unsaturated monocarboxylic acid with a polyepoxide in about equivalent amounts, i.e., about one acid group per polyepoxide group. The preparation of vinyl ester resins, catalysts for the reaction, useful copolymerizable monomers, etc., are described in numerous patents. Typical of these patents is U.S. Pat. No. 3,377,406 which describes certain onium catalysts which may be used to prepare the vinyl ester resins herein and which has an extensive disclosure as to types of polyepoxides, unsaturated acids, etc. Other patents which illustrate the state of the art are U.S. Pat. Nos. 3,179,623; 3,301,743; and 3,256,226.

Briefly, any of the known polyepoxides may be used and include glycidyl polyethers of polyhydric phenols and polyhydric alcohols, epoxy novolacs and the like. Preferred polyepoxides are the bisphenol-based resins and epoxy novolacs which have epoxide equivalent weights of about 150 to 1000. Unsaturated acids include acrylic and methacrylic acids and their various substituted derivatives, cinnamic acid and the like. Also included are the dicarboxylic acid half esters of hydroxyalkyl acrylates as taught in U.S. Pat. No. 3,367,992.

Also included in the definition of the vinyl ester resins used herein are the modified resins in which the resin is post reacted with a dicarboxylic acid anhydride to form pendant half ester groups. Resins of this type are described in U.S. Pat. No. 3,564,074. The resins may also be modified by reaction with isocyanates, other anhydrides, and other reagents reactive with the hydroxyl group produced from the acid/epoxide primary resin-forming reaction. These modification reactions include reaction with up to all of the hydroxy groups present in the vinyl ester resin.

The laminates of this invention are made by mixing into the crosslinkable composition free radical forming catalysts in known amounts and adding this mixture to a suitable fibrous reinforcement such as asbestos fibers, carbon fibers, fibrous glass; or inorganic fibers. Examples of these catalysts are benzoyl peroxide, tertiary butyl peroxide, methylethyl ketone peroxide and the like. It is frequently of value to add accelerators such as cobalt naphthenate, dimethyl aniline, and the like.

The vinyl ester is rolled, sprayed or impregnated into the fibrous reinforcement such as fibrous glass and cured in a manner well known in the art. When fiberous glass is used, it can be in any form such as chopped strands, filaments, glass ribbons, glass yarns, or reinforcing mats.

The following examples are presented to illustrate but not limit the invention.

EXAMPLES 1 AND 2

A commercial vinyl ester resin was blended with various amounts of styrene and dicyclopentadiene acrylate concentrate. The systems evaluated are described in Table I. The vinyl ester resin used was the reaction product of about 9 weight percent methacrylic acid and a polyepoxide which has been prepared by reacting about 3 parts of the diglycidyl ether of bisphenol A with 1 part bisphenol A after which about 1.25 parts by weight of the diglycidyl ether of bisphenol A is blended therewith. The acid/epoxide reaction product is then reacted with about 0.2 part by weight of maleic anhydride.

TABLE I

| | RESIN PROPERTIES | | | | |
|---|---|---|---|---|---|
| | | | | ppm Inhibitor | |
| System | percent vinyl ester resin | percent Styrene | percent DCPD-A | MeHQ | TBC |
| Control A | 55 | 45 | 0 | 100 | 12 |
| Example 1 | 55 | 36 | 9 | 100 | 10 |
| Example 2 | 55 | 27 | 18 | 100 | 7 |

| | | | 180° F. SPI Gel Time | | |
|---|---|---|---|---|---|
| System | min. 22° C. Viscosity | Room Temp. Gel Time | min. Gel Time | min. Cure Time | Maximum Exotherm |
| Control A | 468 cps | 17.7 | 7.4 | 9.4 | 398° F. |
| Example 1 | 890 cps | 17.7 | 6.4 | 8.3 | 393° F. |
| Example 2 | 1932 cps | 21.0 | 8.3 | 8.8 | 376° F. |

MeHQ is methyl hydroquinone
TBC is p-tertiary butyl catechol
DCPD-A is dicyclopentadiene acrylate made from the reaction of one mole of acrylic acid with one mole of dicyclopentadiene concentrate in the presence of $BF_3$ as the catalyst

EXAMPLES 3 AND 4

Glass laminates, containing 25% random fiber glass mat, were prepared using the resin blends in Table I. Two fiber glass plys and a normal hand-roller technique were used to make a part about ⅛-inch thick and 12 inches by 14 inches in dimensions for each resin blend. Table II described the catalysts used with the resin blends so that the gel time would be about 15 to 18 minutes.

TABLE II

| | CATALYST SYSTEM | | | |
|---|---|---|---|---|
| System | Percent Lupersol DDM® | Percent Cobalt Naphthenate 6% | Percent DMA | Room Temp. Gel Time (minutes) |
| Control B (Control A blend) | 1.0 | 0.1 | 0.1 | 17.7 |
| Example 3 (Example 1 blend) | 1.0 | 0.1 | 0.1 | 17.7 |
| Example 4 (Example 2 blend) | 1.2 | 0.1 | 0.1 | 18.4 |

Lupersol DDM® is methylethyl ketone peroxide
DMA is dimethylaniline

The hardness development data is shown in Table III wherein it shows that the hardness development is much more rapid for Examples 3 and 4 and is significantly higher.

TABLE III

| | HARDNESS DEVELOPMENT | | |
|---|---|---|---|
| Time | Control D B | Example 3 B | Example 4 B |
| 45 min. | — | 30 | 16 |
| 1 hr. | 7 | 32 | 21 |
| 2 hrs. | 14 | 31 | 26 |
| 3 hrs. | 16 | 32 | 27 |
| 4 hrs. | 18 | 32 | 31 |
| 5 hrs. | 20 | 33 | 30 |
| 6 hrs. | 21 | 32 | 29 |
| 7 hrs. | 22 | 33 | 31 |
| 8 hrs. | 23 | 32 | 32 |
| 24 hrs. | 26 | 33 | 35 |

B is Barcol Hardness

Heat distortion measurements by ASTM-D648-56 are as follows:

TABLE IV

| Resin | HDT °C. |
|---|---|
| Control | 81 |
| Example 1 | 80 |
| Example 2 | 84.5 |

Table IV shows that DCPD-A effectively takes part in the crosslinking reaction with styrene and the unsaturation of the vinyl ester. A useful product has been obtained.

I claim:

1. A thermosetting resin composition which comprises (A) about 80 to about 30% by weight of a vinyl ester resin having terminal unsaturation, (B) about 20 to about 70% by weight of an unsaturated monomer mixture of a vinyl aromatic monomer and dicyclopentadiene alkenoate concentrate [comprising (a) about 50–100% by weight of compounds of the formula]

[

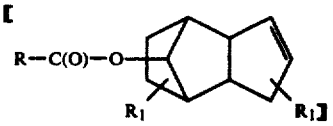

[(b) about 0–30% of compounds of the formula]

[

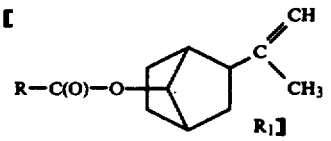

[(c) about 0–2% of compounds of the formula]

[

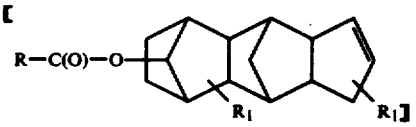

[and (d) about 0–2% of compounds of the formula]

[

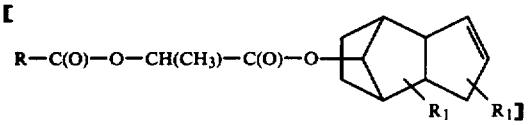

[where R is a alkenyl group having 2–4 carbon atoms and $R_1$ is hydrogen or a methyl group] wherein the range of dicyclopentadiene alkenoate concentrate in said mixture ranges from about 5 to about 90 weight percent.

2. The resin composition of claim 1 wherein the vinyl ester resin is prepared by the reaction of about equivalent proportions of polyepoxides, with ethylenically unsaturated monocarboxylic acids, 2-hydroxyalkyl acrylate half esters of dicarboxylic acids, or mixtures of same with or without the subsequent reaction of dicarboxylic acid anhydrides with the epoxide-unsaturated monocarboxylic acid reaction product.

3. The resin composition of claim 1 wherein the dicyclopentadiene alkenoate concentrate is dicyclopentadiene acrylate.

4. A cured fibrous laminate made with the composition of claim 1.

5. A cured fibrous laminate made with the composition of claim 2.

6. A cured fibrous laminate made with the composition of claim 3.

7. A cured glass fiber laminate made with the composition of claim 1.

8. A cured glass fiber laminate made with the composition of claim 2.

9. A cured glass fiber laminate made with the composition of claim 3.

* * * * *